United States Patent
Stevens et al.

(10) Patent No.: US 12,534,580 B2
(45) Date of Patent: Jan. 27, 2026

(54) IMMOBILIZATION OF INSOLUBLE PARTICLES IN POLYMER

(71) Applicant: Simon Fraser University, Burnaby (CA)

(72) Inventors: David Terence Michael Stevens, Vancouver (CA); Ajit Khosla, Yonezawa (JP); Bonnie Gray, Vancouver (CA); Daniel Leznoff, Vancouver (CA); Hidemitsu Furukawa, Yonezawa (JP)

(73) Assignee: Simon Fraser University, Burnaby (CA)

( * ) Notice: Subject to any disclaimer, the term of this patent is extended or adjusted under 35 U.S.C. 154(b) by 749 days.

(21) Appl. No.: 17/869,733

(22) Filed: Jul. 20, 2022

(65) Prior Publication Data

US 2022/0403119 A1 Dec. 22, 2022

Related U.S. Application Data

(63) Continuation of application No. PCT/CA2021/000007, filed on Jan. 22, 2021.

(60) Provisional application No. 62/964,568, filed on Jan. 22, 2020.

(51) Int. Cl.
  *C08J 3/075* (2006.01)
  *B33Y 70/00* (2020.01)
  *C08J 3/20* (2006.01)
  *G01N 21/78* (2006.01)

(52) U.S. Cl.
  CPC .............. *C08J 3/075* (2013.01); *B33Y 70/00* (2014.12); *C08J 3/203* (2013.01); *G01N 21/783* (2013.01); *C08J 2300/204* (2013.01); *C08J 2300/22* (2013.01); *C08J 2300/24* (2013.01)

(58) Field of Classification Search
  CPC ...... C08J 3/075; C08J 3/203; C08J 2300/204; C08J 2300/22; C08J 2300/24; C08J 3/212; C08J 2367/04; C08J 2369/00; C08J 2371/02; B33Y 70/00; B33Y 10/00; B33Y 80/00; Y02A 50/20; G01N 2021/773
  USPC .......................................................... 524/80
  See application file for complete search history.

(56) References Cited

U.S. PATENT DOCUMENTS

| 9,359,513 B1* | 6/2016 | Takashima ........... C09D 11/107 |
| 2015/0024967 A1* | 1/2015 | Mohapatra ........... C12N 5/0693 506/10 |

FOREIGN PATENT DOCUMENTS

| CN | 107163288 B | 3/2019 |
| WO | 2019097446 A1 | 5/2019 |
| WO | 2019097449 A1 | 5/2019 |

OTHER PUBLICATIONS

Thakkar et al., "Development of 3D-printed polymer-zeolite composite monoliths for gas separation". Chemical Engineering Journal, Sep. 22, 2018 (Sep. 22, 2018), vol. 348(15), pp. 109-116.
Stevens, "Vapochromic Coordination Polymer Immobilization Techniques for Ammonia Sensors with Applications to Power Transformers". MSC Thesis, Simon Fraser University, Apr. 16, 2019 (Apr. 16, 2019). Retrieved on Mar. 28, 2021 (Mar. 28, 2021) from http://summit.sfu.ea/system/files/iritems1/19228/etd20197.pdf p. 24, 1. 24-28; p. 25, 26; p. 27-31.
Stevens et al., "3D Printable Vapochromic Sensing Materials", J. Electrochem. Soc. Nov. 24, 2020 (Nov. 24, 2020), vol. 167(16), 167503.
Rarima et al., "Poly(lactic acid)/gelatin foams by non-solvent induced phase separation for biomedical applications". Polymer Degradation and Stability, Jul. 1, 2020 (Jul. 1, 2020), vol. 177, 109187.
Rezabeigi et al., "Production of porous polylactic acid monoliths via nonsolvent induced phase separation". Polymer Dec. 15, 2014 (Dec. 15, 2014), vol. 55 (26). p. 6743-6753.

* cited by examiner

*Primary Examiner* — Hannah J Pak
(74) *Attorney, Agent, or Firm* — Todd A. Rattray; Oyen Wiggs Green & Mutala LLP

(57) ABSTRACT

A method of immobilization of an insoluble dopant. In some embodiments, the insoluble dopant comprises a coordination polymer. In some embodiments, the insoluble dopant comprises a vapochromic coordination polymer. The method may comprise dissolving a polymer carrier in a solvent. The polymer carrier may comprise a thermoplastic such as, but not limited to, polylactic acid, polyethylene glycol or polycarbonate. The insoluble dopant (e.g. a coordination polymer such as a vapochromic coordination polymer) may then be mixed into the dissolved polymer. Phase separation of the mixture of the dopant and dissolved polymer may be induced to form a hydrogel. The hydrogel may be employed as is (e.g. as a raw material for hydrogel 3D printing, as a sensing material, etc.) or may undergo further processing (e.g. solidification, grinding, extrusion, etc.) before being employed, for example, as a raw material for 3D printing, as a sensing material, etc.

18 Claims, 8 Drawing Sheets

IMMOBILIZATION OF INSOLUBLE PARTICLES IN POLYMER

REFERENCE TO RELATED APPLICATIONS

This application is a continuation of Patent Cooperation Treaty (PCT) application No. PCT/CA2021/000007 having an international filing date of 22 Jan. 2021, which in turn claims priority from, and for the purposes of the United States the benefit of 35 USC § 119 in respect of, U.S. application No. 62/964,568 filed 22 Jan. 2020. All of the applications in this paragraph are hereby incorporated herein by reference.

TECHNICAL FIELD

This invention relates to immobilization of insoluble particles. Particular embodiments provide methods for immobilization of vapochromic coordination polymers to provide vapochromic sensing materials.

BACKGROUND

Vapochromic coordination polymers are metal-ligand based supramolecular materials constructed primarily from coordination bonding. Vapochromic coordination polymers exhibit changes in their spectroscopic signature in response to exposure to target analytes. For example, the $Zn[Au(CN)_2]_2$ vapochromic coordination polymer is highly sensitive to ammonia where, depending on the polymorph, its spectroscopic emission signature changes from 400-450 nm to 480-580 nm upon exposure to ammonia under excitation with a 405 nm radiation source. Vapochromic coordination polymers can be used in sensors for detection of target analytes, such as ammonia, for example, in environments not suitable for other types of chemical sensors (e.g. high moisture environments, environments comprising volatile/reactive analytes, etc). The accurate detection of ammonia, in particular, is important as it is toxic to humans at levels above 25 parts per million ("ppm"). For many ammonia detection applications, there is a desirability for accurate detection at levels of 5 ppm and less. For example, ammonia is a chemical that is commonly found in many areas such as: agriculture, refrigeration systems, and power transformers, where detection levels of 1 ppm may be desired.

Vapochromic coordination polymers are typically difficult to immobilize while retaining their sensing properties. This difficulty is partly due to the insolubility of many vapochromic coordination polymers in most solvents, which makes most methods of immobilization based on drop casting or spin casting difficult. Additionally, for vapochromic coordination polymers to remain effective after immobilization, there is a desirability for any immobilization method to refrain from unduly restricting analyte access to the total surface area of the vapochromic coordination polymer crystals to allow for interaction with the analyte to occur. This desirability makes most adhesives unsuitable for use in immobilization as well. Another desirability for immobilization of any vapochromic coordination polymer (e.g., $Zn[Au(CN)_2]_2$) is that any materials or polymers used to immobilize the vapochromic coordination polymer not unduly interfere with the excitation and fluorescence and/or phosphorescence response of the vapochromic coordination polymer (e.g., between the wavelengths of 400 to 580 nm for $Zn[Au(CN)_2]_2$).

There is a general desire for practical and effective methods of immobilizing insoluble particles comprising materials such as, but not limited to, coordination polymers (e.g. vapochromic coordination polymers, including the $Zn[Au(CN)_2]_2$ vapochromic coordination polymer). There is a general desire for practical and effective methods for fabricating sensing materials incorporating insoluble particles, such as, but not limited to, vapochromic sensing materials such as, but not limited to, vapochromic sensing materials incorporating the $Zn[Au(CN)_2]_2$ vapochromic coordination polymer.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a method for immobilizing insoluble dopants in polymer. The method comprises dissolving a polymer carrier in a solvent, mixing an insoluble dopant in the dissolved polymer carrier to form a doped mixture and inducing phase separation of the doped mixture to obtain a doped hydrogel.

In some embodiments, the method comprises allowing the doped hydrogel to solidify to form a doped solid. In some embodiments, the method comprises allowing the doped hydrogel to solidify through solvent exchange. In some embodiments, the method comprises allowing the doped hydrogel to solidify through solvent exchange by adding methanol to the doped hydrogel. In some embodiments, the method comprises activating the doped solid by exposing the doped solid to a target analyte. In some embodiments, the method comprises activating the doped solid by exposing the doped solid to a target analyte in a gaseous form. In some embodiments, the method comprises forming pellets from the doped solid. In some embodiments, the method comprises extruding the doped solid into 3D-printable filament.

In some embodiments, the solvent comprises a halogenated solvent. In some embodiments, the solvent comprises dichloromethane. In some embodiments, the solvent comprises a hydrocarbon solvent. In some embodiments, the solvent comprises cyclohexane. In some embodiments, the solvent comprises an aromatic solvent. In some embodiments, the solvent comprises toluene. In some embodiments, the solvent comprises chloroform.

In some embodiments, dissolving the polymer carrier in the solvent comprises dissolving between 13% and 25% (by weight) polymer carrier in the solvent. In some embodiments, dissolving the polymer carrier in the solvent comprises dissolving approximately 18% (by weight) polymer carrier in the solvent.

In some embodiments, the polymer carrier comprises a thermoplastic polymer. In some embodiments, the polymer carrier comprises a thermoplastic polymer having a glass transition temperature of less than 600° C. In some embodiments, the polymer carrier comprises a thermoset polymer. In some embodiments, the polymer carrier comprises a UV-curable polymer. In some embodiments, the polymer carrier comprises a UV-curable polymer that is curable by exposure to UV radiation of wavelengths between 200 nm and 600 nm. In some embodiments, the polymer carrier comprises a UV-curable polymer that is curable by exposure to UV radiation of wavelengths between 300 nm and 450 nm. In some embodiments, the polymer carrier comprises polylactic acid. In some embodiments, the polymer carrier comprises polyethylene glycol. In some embodiments, the polymer carrier comprises polycarbonate.

In some embodiments, the dopant comprises a coordination polymer. In some embodiments, the dopant comprises a functional coordination polymer. In some embodiments, the dopant comprises a sensing coordination polymer. In some embodiments, the dopant comprises an emissive coordination polymer. In some embodiments, the dopant comprises a magnetic coordination polymer. In some embodiments, the dopant comprises a porous coordination polymer. In some embodiments, the dopant comprises a conducting coordination polymer. In some embodiments, the dopant comprises a spin-transition coordination polymer. In some embodiments, the dopant comprises a spin-crossover metal-containing coordination polymer. In some embodiments, the dopant comprises a catalytically active coordination polymer. In some embodiments, the dopant comprises a vapochromic coordination polymer.

In some embodiments, the dopant comprises a cyanometallate coordination polymer. In some embodiments, the dopant comprises a cyanoaurate coordination polymer. In some embodiments, the dopant comprises a cyanoplatinate (II) coordination polymer. In some embodiments, the dopant comprises a cyanoplatinate (IV) coordination polymer.

In some embodiments, the dopant comprises $Cu[Pt(CN)_4 X_2]$ where X=Cl or X=Br. In some embodiments, the dopant comprises $Zn[Au(CN)_2]_2$. In some embodiments, the dopant comprises $[NBu_4]_6(Cd_4Cl_4)_2(Au(CN)_2)_{12}[CdCl_4]$. In some embodiments, the dopant comprises $[NBu_4]_6(Cd_4Br_4)_2(Au(CN)_2)_{12}[CdBr_4]$. In some embodiments, the dopant comprises $[Bu_4N]_2[Cd(Au(CN)_2)_4]$. In some embodiments, the dopant comprises $Cd(NH_3)_2[Au(CN)_2]_2$. In some embodiments, the dopant comprises $Cd[Au(CN)_2]_2$. In some embodiments, the dopant comprises $Zn[Pt(CN)_4]$. In some embodiments, the dopant comprises $Cd[Pt(CN)_4]$. In some embodiments, the dopant comprises $Pb[Pt(CN)_4]$. In some embodiments, the dopant comprises $Co[Pt(SCN)_4]$.

In some embodiments, the dopant comprises $M_W[M'_X (Z)_Y]_N$ wherein M and M' are the same or different metals capable of forming a coordinate complex with the z moiety, Z is selected from the group consisting of halides, pseudohalides, aliphatic or aromatic amines, heterocyclic amines, thiolates, alkoxides and amides, W is between 1 and 6, X and Y are between 1 and 9 and N is between 1 and 5. In some embodiments, M comprises Cu, Ag, Au, Zn, Ni, Pd or Pt. In some embodiments, the pseudohalide comprises CN, SCN, SeCN, TeCN, OCN, CNO or NNN.

In some embodiments, mixing the dopant in the dissolved polymer carrier comprises mixing less than 85% (by weight) dopant in the dissolved polymer carrier. In some embodiments, mixing the dopant in the dissolved polymer carrier comprises mixing less than 50.0% (by weight) dopant in the dissolved polymer carrier. In some embodiments, mixing the dopant the dissolved polymer carrier comprises mixing less than 10.0% (by weight) dopant in the dissolved polymer carrier. In some embodiments, mixing the dopant in the dissolved polymer carrier comprises mixing less than 2.0% (by weight) dopant in the dissolved polymer carrier. In some embodiments, mixing the dopant in the dissolved polymer carrier comprises mixing approximately 1.8% (by weight) dopant in the dissolved polymer carrier.

In some embodiments, inducing phase separation of the doped mixture comprises mixing the doped mixture with a secondary solvent. In some embodiments, the secondary solvent comprises n-hexane. In some embodiments, the secondary solvent comprises tetrahydrofuran. In some embodiments, the secondary solvent comprises cyclohexane. In some embodiments, the secondary solvent comprises benzaldehyde.

In some embodiments, mixing the doped mixture with the secondary solvent comprises mixing the doped mixture with the secondary solvent at a ratio of between 0.25:1 and 1:1 (by volume). In some embodiments, mixing the doped mixture with the secondary solvent comprises mixing the doped mixture with the secondary solvent at a ratio of approximately 1:1 (by volume).

In some embodiments, the method comprises activating the doped hydrogel by exposing the doped hydrogel to a target analyte. In some embodiments, the method comprises activating the doped hydrogel by exposing the doped hydrogel to a target analyte in a gaseous form.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

One aspect of the invention provides a method of immobilization of an insoluble dopant. In some embodiments, the insoluble dopant comprises a coordination polymer. In some embodiments, the insoluble dopant comprises a vapochromic coordination polymer. The method may comprise dissolving a polymer carrier in a solvent. The polymer carrier may comprise a thermoplastic such as, but not limited to, polylactic acid, polyethylene glycol or polycarbonate. The insoluble dopant (e.g. a coordination polymer such as a vapochromic coordination polymer and/or the like) may then be mixed into the dissolved polymer. Phase separation of the mixture of the dopant and dissolved polymer may be induced to form a hydrogel. The hydrogel may be employed as is (e.g. as a raw material for hydrogel 3D printing, as a sensing material, etc.) or may undergo further processing (e.g. solidification, grinding, extrusion, etc.) before being employed, for example, as a raw material for 3D printing, as a sensing material, etc.

Figure 1:
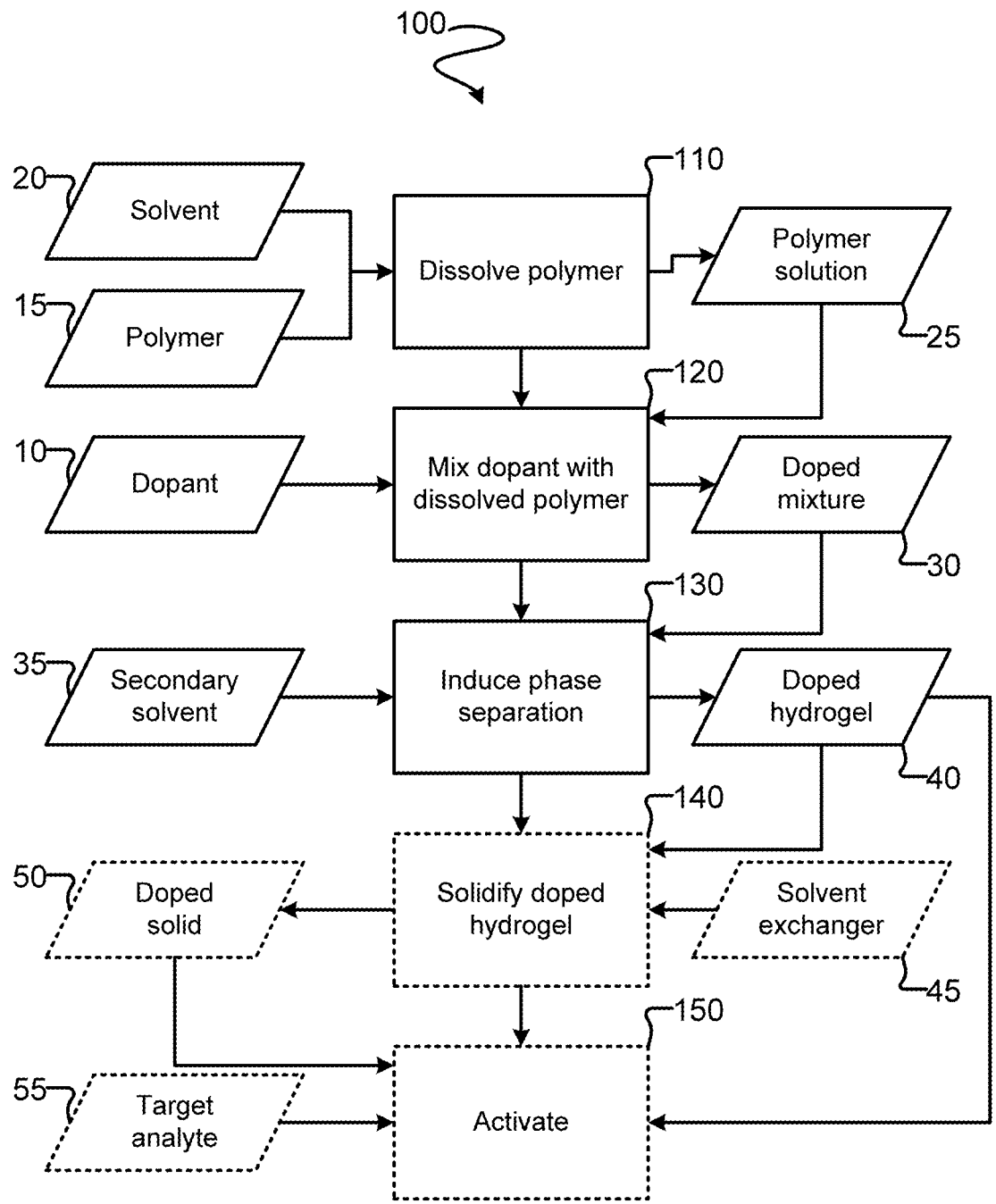
FIG. 1 depicts an exemplary non-limiting method of immobilizing an insoluble dopant according to one embodiment of the invention.
Figure 2B:
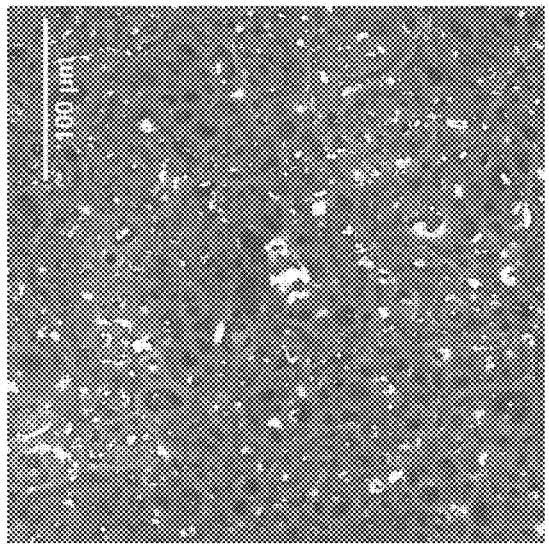
FIG. 2B is a scanning electron microscope image of a vapochromic sensing material of FIG. 2A at a higher resolution.
Figure 2D:
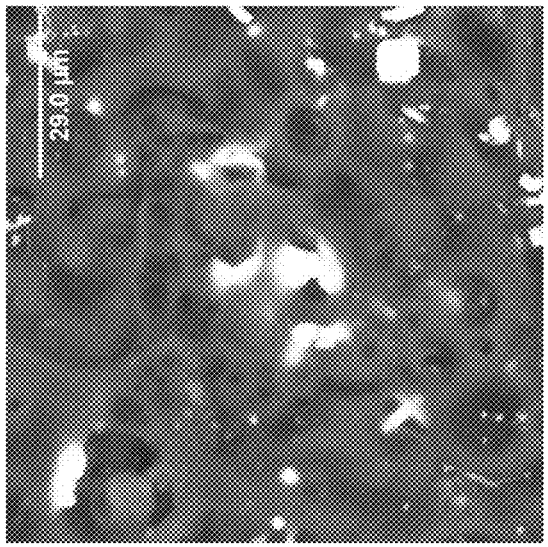
FIG. 2D is a scanning electron microscope image of a vapochromic sensing material of FIG. 2A at a higher resolution.
Figure 2A:
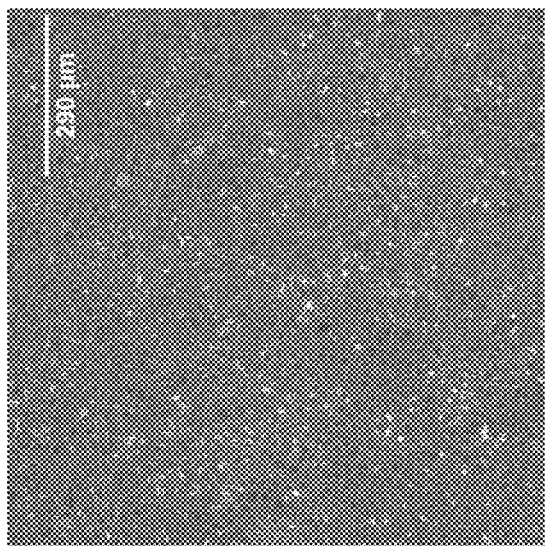
FIG. 2A is a scanning electron microscope image of a vapochromic sensing material according to one embodiment of the invention.
Figure 2C:
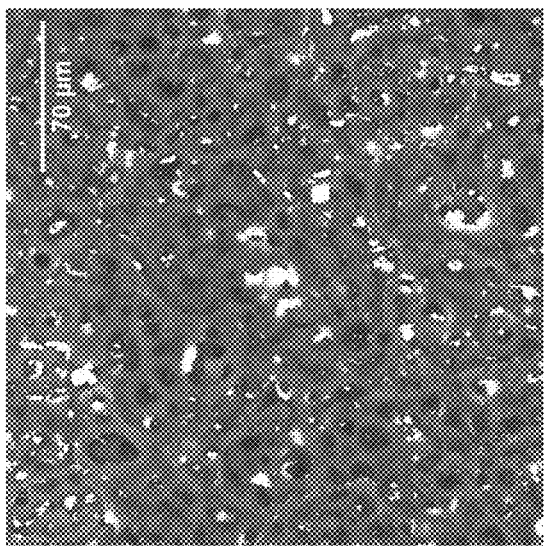
FIG. 2C is a scanning electron microscope image of a vapochromic sensing material of FIG. 2A at a higher resolution.

FIG. 1 depicts an exemplary non-limiting method 100 for immobilization of an insoluble dopant 10 in a polymer carrier 15 according to a particular embodiment.

At step 110, a polymer carrier 15 is dissolved in a solvent 20. After mixing polymer carrier 15 and solvent 2, the mixture may be left for a period of time to achieve a homogeneous polymer solution 25. In some embodiments, such a period of time may be between approximately 1 and 3 hours. In some embodiments, such a period of time may be approximately 2 hours. Step 110 may comprise sonicating or otherwise agitating the mixture to facilitate dissolution of polymer carrier 15 in solvent 20.

Polymer carrier 15 may comprise any suitable polymer. Polymer carrier 15 may, for example, comprise a polymer commonly used in additive manufacturing (e.g. 3D printing). In some embodiments, polymer carrier 15 comprises a thermoplastic polymer such as, but not limited to, polylactic acid, polycarbonate, polyethylene glycol. Further examples of suitable thermoplastic polymers include acrylonitrile butadiene styrene, polyurethane, cyclic olefin polymers and co-polymers, acrylates such as poly methyl methacrylate, vinyl ethers, polysulfone, polyethylene, polyethylene terephthalate glycol, polydimethylsiloxane, polyvinyl chloride, combinations of such materials and/or the like. In some embodiments, polymer carrier 15 comprises a thermoplastic polymer having a glass transition temperature below 600° C. In some embodiments, polymer carrier 15 comprises a UV curable polymer. In some embodiments, polymer carrier 15 comprises a UV curable polymer that is curable by exposure to UV radiation having wavelengths between approximately 200 nm and 600 nm. In some embodiments, polymer carrier 15 comprises a UV curable polymer that is curable by exposure to UV radiation having wavelengths between approximately 300 nm and 450 nm. In some embodiments, polymer carrier 15 comprises a thermoset polymer such as, but not limited to, polyurethane. Polymer carrier 15 may be transparent or translucent to electromagnetic radiation in the visible light spectrum. In some embodiments, polymer carrier 15 may be uncoloured (e.g. dye-free).

Solvent 20 may comprise any suitable solvent capable of dissolving polymer carrier 20. Solvent 20 may comprise, for example, a halogenated solvent, a hydrocarbon solvent (e.g. a non-polar hydrocarbon solvent) or an aromatic solvent. In some embodiments, solvent 20 comprises dichloromethane, cyclohexane, chloroform or toluene.

The composition of solvent 20 may be dependent on the composition of polymer carrier 15. For example, where polymer carrier 15 comprises polylactic acid, solvent 20 may comprise dichloromethane and secondary solvent 35 (discussed further herein) may comprise n-hexane. As another example, where polymer carrier 15 comprises polylactic acid, solvent 20 may comprise cyclohexane and secondary solvent 35 may comprise tetrahydrofuran. As another example, where polymer carrier 15 comprises polycarbonate, solvent 20 may comprise chloroform and secondary solvent 35 may comprise cyclohexane. As a further example, where polymer carrier 15 comprises cyclic olefin copolymer, solvent 20 may comprise cyclohexane and solvent 35 may comprise benzaldehyde.

The amount of polymer carrier 15 added to solvent 20 at step 110 may be dependent on a desired porosity of a hydrogel output from step 130 of method 100. In some embodiments, the amount of polymer carrier 15 added to solvent 20 at step 110 is between approximately 13% to 25% (by weight) of polymer solution 25. In some embodiments, this amount of polymer carrier 15 is between approximately 18% to 25% (by weight) of polymer solution 25. In some embodiments, this amount of polymer carrier 15 is between approximately 18% to 23% (by weight) of polymer solution 25. In some embodiments, an amount of polymer carrier 15 added to solvent 20 at step 110 may be approximately 18% (by weight) of polymer solution 25.

After polymer carrier 15 is dissolved in solvent 20 to form polymer solution 25, dopant 10 is mixed with polymer solution 25 at step 120 to form doped mixture 30. Dopant 10 may comprise an insoluble particle. For example, dopant 10 may comprise a coordination polymer. More specifically, dopant 10 may comprise a functional coordination polymer that exhibits some functional characteristic, such as, without limitation, an emissive coordination polymer, a magnetic coordination polymer, a vapochromic coordination polymer, a spin-transition coordination polymer, a spin-crossover metal-containing coordination polymer, a conducting coordination polymer (e.g. proton-conducting coordination polymer, an ionic-conducting coordination polymer, an electrically conducting coordination polymer), a catalytically active coordination polymer, a porous coordination polymer, and/or the like. Dopant 10 may comprise a sensing coordination polymer—that is, a coordination polymer that exhibits some observable change of a characteristic in response to exposure to a target analyte. Examples of magnetic coordination polymers include, but are not limited to, modified Prussian Blue compounds and metal tetracyanoethylene compounds.

Dopant 10 may include vapochromic coordination polymer compounds having the general formula $M_W[M'_X(Z)_Y]_N$ wherein M and M' are the same or different metals capable of forming a coordinate complex with the Z moiety; Z is selected from the group consisting of halides, pseudohalides, thiolates, aliphatic or aromatic amines, heterocyclic amines, alkoxides and amides; W is between 1-6; X and Y are between 1-9; and N is between 1-5. Optionally, an organic ligand may be bound to M. In some embodiments of the invention M may be a transition metal, such as Cu and/or Zn, M' may be a metal such as Au, Ag, Ni, Pd, Pt, Zn, Hg and/or Cu, and Z may be a pseudohalide, such as CN, SCN, SeCN, TeCN, OCN, CNO and/or NNN. In some embodiments of the invention the metal M may be a $1^{st}$ row transition metal other than Cu or Zn, such as Sc, Ti, V, Cr, Mn, Fe, Co, and/or Ni, or some other transition-metal such as Zr, Nb and/or Ru. M may also be a lanthanide or actinide. Optionally, an organic ligand may be bound to M. The ligand may be any ligand capable of capping the metal cation, and may include nitrogen, oxygen, sulfur and/or phosphorus donors. Depending upon the resultant charge of the $M_W[M'_X(Z)_Y]_N$ structure, a charge-balancing ion, either a cation or anion, may also be present. For example, a charge balancing ion may be desired where M' is Hg or Zn. In some embodiments of the invention, the metal M' may be selected to produce linear metal cyanides or non-linear cyanides. For example, cyanometallate units such as $[Au(CN)_2]^-$, $[Ag(CN)_2]^-$, $[Hg(CN)_2]$, $[Pt(CN)_4]^{2-}$, $[Pd(CN)_4]^{2-}$, $[Ni(CN)_4]^{2-}$ or $[Zn(CN)_4]^{2-}$ may be incorporated into vapochromic coordination polymer 10 in conjunction with different transition metal cations and supporting ligands according to the following general equation: [METAL cation+organic ligand$_z$+$[M'(CN)_x]^{Y-}$ [METAL(ligand)$_z$] $[M'(CN)_x]_n$ where n=1-5, x=2-9, y=−5 to 0 and z=0-9. In some embodiments, [Metal(CN)$_2$]-based coordination polymers with vapochromic properties are employed, such as $Cu[Au(CN)_2]_2$ and $Zn[Au(CN)_2]_2$ polymers. In some embodiments, [Metal(CN)$_4$]— or [Metal (XCN)$_4$]-based (X=S, Se) coordination polymers with vapochromic properties are employed, such as $Cd[Pt(CN)_4]$, $Zn[Pt(CN)_4]$, $Pb[Pt(CN)_4]$, $Co[Pt(SCN)_4]$ or $Co[Pd(SCN)_4]$ coordination polymers.

Dopant 10 may include vapochromic coordination polymer compounds of the form $[Q]_2[Au_2(i\text{-}mnt)_2]$ where i-mnt represents $(CN)_2C$[double bond, length as m-dash]$CS_2(2-)$ and Q represents a cation, including but not limited to tetra-alkylammonium cations such as nButyl$_4$N, Me$_4$N and non-symmetrical variations thereof (such as nButyl$_3$MeN) and their phosphonium and arsonium analogues, and protonated heterocyclic amines such as 3,5-dimethylpyrazolium, piperidinium. Dopant 10 may include vapochromic coordination polymer compounds of the form [Cation]MX[Au (CN)$_2$]$_2$ and [Cation]MX$_2$[Au(CN)$_2$] where M represents Zn, Cd and X represents Cl or Br. Dopant 10 may comprise cyanometallate coordination polymers. Dopant 10 may comprise cyanoaurate coordination polymers. Dopant 10 may comprise cyanoplatinate (II) coordination polymers. Dopant 10 may comprise cyanoplatinate (IV) coordination polymers.

Where dopant 10 is a sensing coordination polymer, selection of the composition of dopant 10 employed at step 120 may be dependent on a desired target analyte to be sensed by a sensing material fabricated according to method 100. In some embodiments, dopant 10 comprises one or more of the following vapochromic coordination polymers:

$Zn[Au(CN)_2]_2$;
$[NBu_4]_6(Cd_4Cl_4)_2(Au(CN)_2)_{12}[CdCl_4]$;
$[Bu_4N]_2[Cd(Au(CN)_2)_4]$;
$[NBu_4]_6(Cd_4Br_4)_2(Au(CN)_2)_{12}[CdBr_4]$;
$Cd(NH_3)_2[Au(CN)_2]_2$;
$Cu_{2/3}Au_{1/3}CN$;
$Cu[Au(CN)_2]$;
$Zn[Pt(CN)_4]$;
$Cd[Pt(CN)_4]$;
$Pb[Pt(CN)_4]$;
$Cu[Pt(CN)_4X_2]$ where X=Cl or Br; and
$Co[Pt(SCN)_4]$.

$Zn[Au(CN)_2]_2$, $[NBu_4]_6(Cd_4Cl_4)_2(Au(CN)_2)_{12}[CdCl_4]$, $[Bu_4N]_2[Cd(Au(CN)_2)_4]$, $[NBu_4]_6(Cd_4Br_4)_2(Au(CN)_2)_{12}[CdBr_4]$ and $Cd(NH_3)_2[Au(CN)_2]_2$ are each vapochromic coordination polymers sensitive to ammonia and small molecule amines and may therefore be employed where ammonia or small molecule amines are the desired target analyte to be sensed by a sensing material fabricated according to method 100. $Cu_{2/3}Au_{1/3}CN$ is a vapochromic coordination polymer sensitive to dimethylsulfide and may therefore be employed where dimethylsulfide is the desired target analyte to be sensed by a sensing material fabricated according to method 100. Coordination polymers of the composition $Cu[Pt(CN)_4X_2]$ where X=Cl or Br are sensitive to donor-atom containing organic solvents such as, but not limited to, pyridines, dimethylformamide and dimethylsulfoxide.

It is known that coordination polymers, and specifically sensing coordination polymers, such as, without limitation vapochromic coordination polymers, may employed to sense (e.g. exhibit an observable change of a characteristic in response to exposure to) a broad variety of target analytes, including (without limitation) a broad variety of gases. Dopant 10 may comprise any such coordination polymers. For example, potential target analytes of sensing materials fabricated according to method 100 include gases comprising amines, phosphines, thiols, S-donor compounds (e.g. thioethers and disulfides), carbon monoxide, carbon dioxide, nitrogen oxides, sulfur dioxide, hydrogen sulfide, dimethylsulfide, other dialkylsulfides and di-arylsufides, volatile organic compounds, etc. Further, potential target analytes of sensing materials fabricated according to method 100 may include nanoparticles, neutrons and other radiation.

At step 120, the amount of dopant 10 added to polymer solution 25 may be less than approximately 85% (by weight) of doped mixture 30. In some embodiments, the amount of dopant 10 added to polymer solution 25 may be less than approximately 50.0% (by weight) of doped mixture 30. In some embodiments, the amount of dopant 10 added to polymer solution 25 may be less than approximately 10.0% (by weight) of doped mixture 30. In some embodiments, the amount of dopant 10 added to polymer solution 25 may be less than approximately 2.0% (by weight) of doped mixture 30. In some embodiments, at step 120 the amount of dopant 10 added to polymer solution 25 may be approximately 1.8% (by weight) of doped mixture 30.

At step 130, phase separation of doped mixture 30 is induced to obtain a doped hydrogel 40. Phase separation of doped mixture 30 may be induced using any suitable technique. In some embodiments, phase separation of doped mixture 30 is induced by mixing secondary solvent 35 with doped mixture 30. In some embodiments, secondary solvent 35 comprises n-hexane, tetrahydrofuran, cyclohexane or benzaldehyde. In some embodiments, secondary solvent 35 is mixed with doped mixture 30 at a ratio of between approximately 0.25:1 and 1:1 (by volume). In some embodiments, this ratio is between approximately 0.75:1 and 1:1 (by volume). In some embodiments, secondary solvent 35 is mixed with doped mixture 30 at a ratio of approximately 1:1 (by volume).

After doped hydrogel 40 is obtained, doped hydrogel 40 may be kept in a mixture of secondary solvent 35 and solvent 20 to prevent drying out of doped hydrogel 40. In some embodiments, this mixture comprises secondary solvent 35 mixed with solvent 20 at a ratio of between approximately 0.25:1 and 1:1 (by volume). In some embodiments, this ratio is between approximately 0.75:1 and 1:1 (by volume). In some embodiments, secondary solvent 35 is mixed with solvent 20 at a ratio of approximately 1:1 (by volume).

At this stage, doped hydrogel 40 may be employed as desired for a variety of applications. For some applications, the porous nature and/or high surface area of doped hydrogel 40 may be desirable and doped hydrogel 40 may therefore be employed as-is (e.g. as a vapochromic sensing material or otherwise depending on the composition of dopant 10 employed). For example, doped hydrogel 40 may be employed as a raw material in additive manufacturing processes, such as hydrogel-based 3D printing. Alternatively, further processing of doped hydrogel 40 may occur at step 140.

At step 140, doped hydrogel 40 may optionally be solidified. In some embodiments, a solvent exchanger 45 is employed to facilitate solidification of doped hydrogel 40. For example, methanol may be employed as solvent exchanger 45. The volume of solvent exchanger 45 employed at step 140 may be approximately ten times the volume of the solvents employed in method 100 at step 130. In optional step 140, doped hydrogel 40 may be added to a methanol bath and the solvents may be allowed to evaporate over a period of time, thereby forming a doped solid 50. Such a period of time may be between approximately 12 hours and 60 hours. In some embodiments, this period of time may be between approximately 24 hours and 48 hours. Doped solid 50 may then be employed as-is (e.g. as a vapochromic sensing material or otherwise depending on the composition of dopant 10 employed). For some applications, doped solid 50 may be formed into pellets and/or extruded or drawn into filaments suitable for being employed as a raw material for additive manufacturing (e.g. 3D printing) using known techniques.

Where dopant 10 comprises a vapochromic coordination polymer, it may be desirable that a resultant vapochromic sensing material (e.g. doped hydrogel 40 or doped solid 50 or a further processed version thereof) fabricated according to steps 110 to 130 or steps 110 to 140 may be "activated" to increase its sensitivity. At step 150, doped hydrogel 40 or doped solid 50 (depending on whether optional step 140 has occurred) or a further processed version thereof may optionally be activated to increase the sensitivity of the resultant vapochromic sensing material. Activation may comprise exposing doped hydrogel 40 or doped solid 50 or a further processed version thereof (as the case may be) to a target analyte 55 for between approximately one minute and two hours. Activation may comprise exposing doped hydrogel 40 or doped solid 50 or a further processed version thereof (as the case may be) to a target analyte 55 for between approximately one minute and one hour. Activation may comprise exposing doped hydrogel 40 or doped solid 50 or a further processed version thereof (as the case may be) to a target analyte 55 for between approximately one minute and ten minutes. Target analyte 55 may be in gaseous form to facilitate exposure of the vapochromic sensing material to target analyte 55.

After activation, target analyte 55 may then be allowed to dissipate over a suitable period of time. In some embodiments, such a period of time to allow for dissipation of target analyte 55 may be between approximately 12 hours and 60 hours. In some embodiments, this period of time is between approximately 24 hours and 48 hours. Dissipation of target analyte 55 may be assisted with heat, a vacuum/pump or the like.

For example, where dopant 10 comprise a vapochromic coordination polymer having a composition $Zn[Au(CN)_2]_2$ and target analyte 55 comprises ammonia, doped hydrogel 40 or doped solid 50 or a further processed version thereof (as the case may be) may be exposed to gas drawn from the headspace of a bottle of ammonia hydroxide for a period of between approximately 1 hour and 2 hours. In some embodiments, during optional activation step 150, the ammonia hydroxide may be of a concentration of between approximately 20% and 40% (by volume). In some embodiments, the ammonia hydroxide may be of a concentration of approximately 28% (by volume).

In some embodiments, it may be suitable to omit step 150. However, employing step 150 may increase the sensitivity of a sensing material fabricated according to method 100 to the low ppm detection range (e.g. less than 5 ppm, less than 2 ppm or even approximately 1 ppm).

Experimental Results

Method 100 was employed to form a vapochromic sensing material as follows. At step 110, 1.81 g of polylactic acid polymer carrier 15 was dissolved in 6.7 mL to 7.0 mL of dichloromethane solvent 20 in a vial to form polymer solution 25. The vial was sonicated for 1.5 hours and then left to rest for 1.5 hours. At step 120, 36.2 mg of $Zn[Au(CN)_2]_2$ dopant 10 with moisture removed was mixed with polymer solution 25 to form doped mixture 30. After doped mixture 30 was formed at step 120, 6.7 mL of n-hexane secondary solvent 35 was added and mixed with doped mixture 30 to induce the formation of doped hydrogel 40 at step 130. At step 140, the doped hydrogel 40 was transferred to an evaporation dish and the evaporation dish was filled with methanol solvent exchanger 45. The evaporation dish was then covered loosely to allow the solvents to evaporate over a period of between 24 hours and 48 hours to produce a doped solid 50.

FIGS. 2A to 2D are scanning electron microscope photographs of a doped solid 50 fabricated according to method 100. As can be seen from FIGS. 2A to 2D the doped solid 50 exhibits a high porosity. Further, it can be seen that dopant 10 (which is represented by the lighter areas shown in FIGS. 2A to 2D) is uniformly distributed throughout doped solid 50. This high porosity and even distribution of dopant 10 allows for better exposure of dopant 10 to a target analyte, which, in turn, leads to a more sensitive sensing material.

Figure 3:
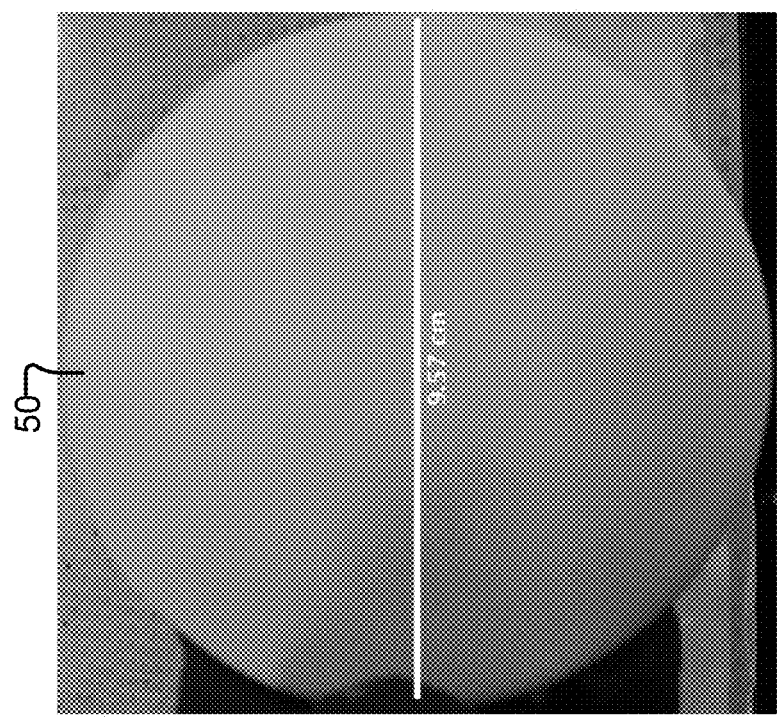
FIG. 3 is a photograph of a solid doped polymer fabricated according to one embodiment of the invention.

FIG. 3 is a photograph of doped solid 50 fabricated according to method 100.

Figure 4:
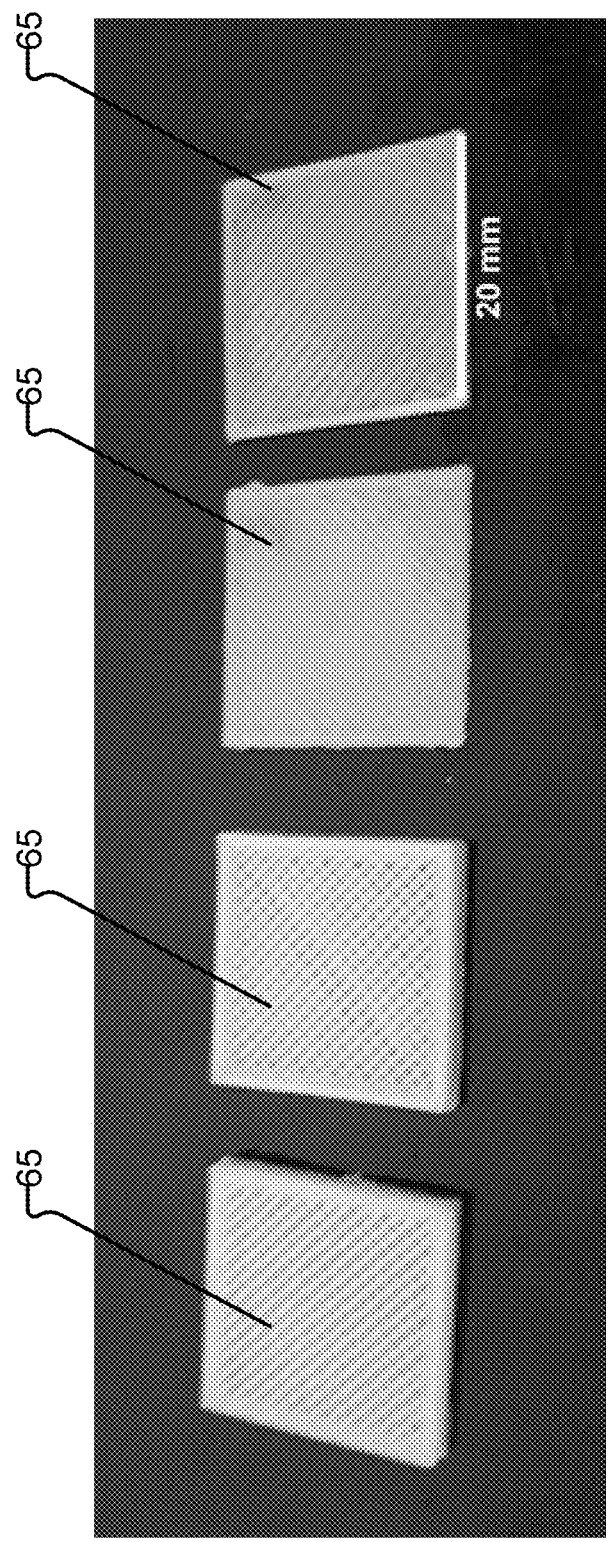
FIG. 4 is a photograph of 3D printed vapochromic sensing materials fabricated according to one embodiment of the invention.

The doped solid 50 was then ground into pellets and placed in a filament extruder (Nortek Pro™) operating at 215° C. and an extruding rate of 2.5 m/min, which produced a 1.75 mm filament. The filament was then used in a 3D printer (Makerbot™) operating at 220° C. to produce vapochromic sensing material matrices 65 as shown in FIG. 4. At step 150, vapochromic sensing material matrices 65 were exposed to gas drawn from the headspace of a 28% (by volume) Ammonia Hydroxide bottle and sealed for a period of between approximately one and two hours before being left under a fume hood for another period of between approximately 24 hours and 48 hours.

The doped solid 50 was separated into samples which were individually placed inside a sealed 3.5 ml cork-seal quartz cuvette. A gas mixer (Environics™ Series 4840) was employed to supply gas of concentrations of 1 ppm to 5 ppm ammonia into the cuvette at a rate of 1.94 ml/s. A 405 nm deep-violet diode laser light source was employed to excite the samples and a small spectrometer (PhotonControl™ SPM-002) was employed to record the digital spectrum.

In some cases, (e.g. where sensing ammonia concentrations of less than 50 ppm), the spectral shift observed by comparing the digital spectrum for unexposed solid doped polymer 50 and the digital spectrum for exposed solid doped polymer 50 becomes hidden within the overall changing fluorescent spectrum shape. To better measure the spectral shift, the digital spectrum data was processed by separating the spectrum into two regions by wavelength. For FIGS. 5, 6A to 6C and 8, the first region was from 425 nm to 516 nm and the second region was from 516 nm to 650 nm. Next, the integrated emissions under both regions were computed, and the value of shorter wavelength region (A) was subtracted from the longer wavelength one (B) to provide a measure referred to as "a spectral region subtraction". These values were then normalized to find a common scale. The normalized measure is referred to herein as the "normalized spectral region subtraction".

Figure 5:
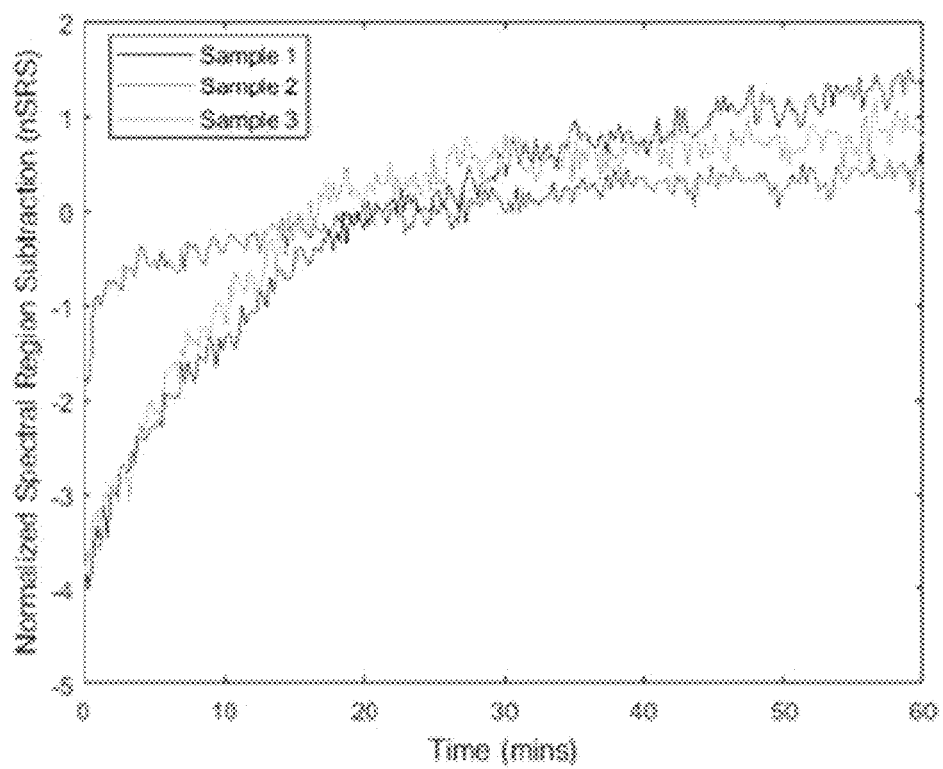
FIG. 5 depicts a plot of normalized spectral region subtraction against time for three samples of vapochromic sensing materials fabricated according to embodiments of the invention.
Figure 6A:
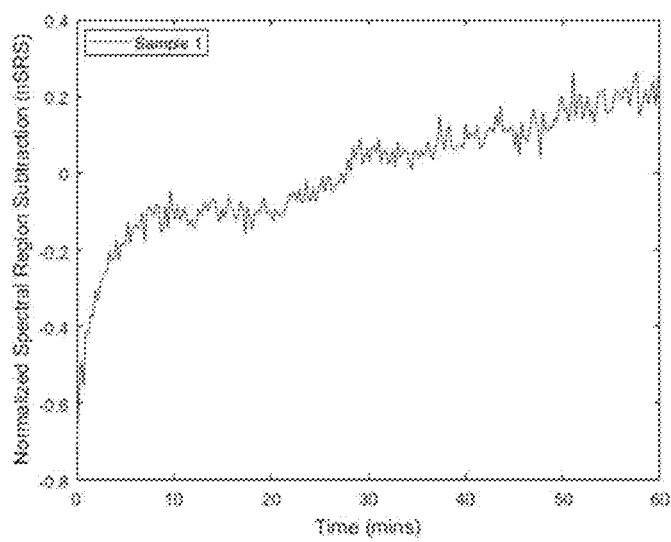
FIG. 6A depicts a plot of normalized spectral region subtraction against time for a first sample of vapochromic sensing materials fabricated according to one embodiment of the invention.
Figure 6B:
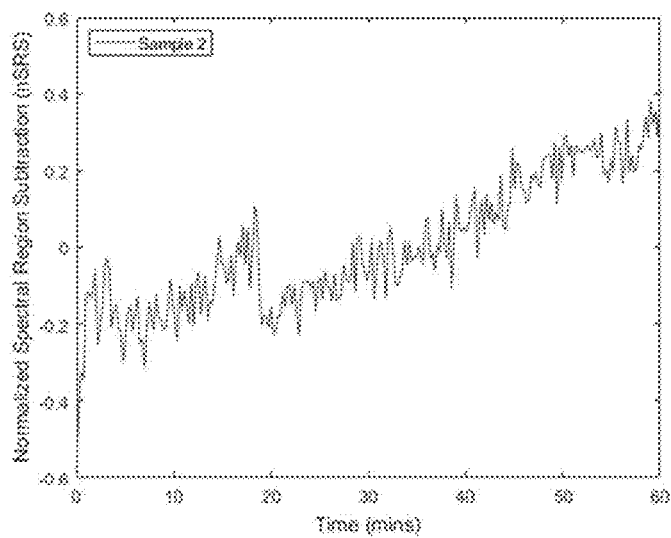
FIG. 6B depicts a plot of normalized spectral region subtraction against time for a second sample of vapochromic sensing materials fabricated according to one embodiment of the invention.
Figure 6C:
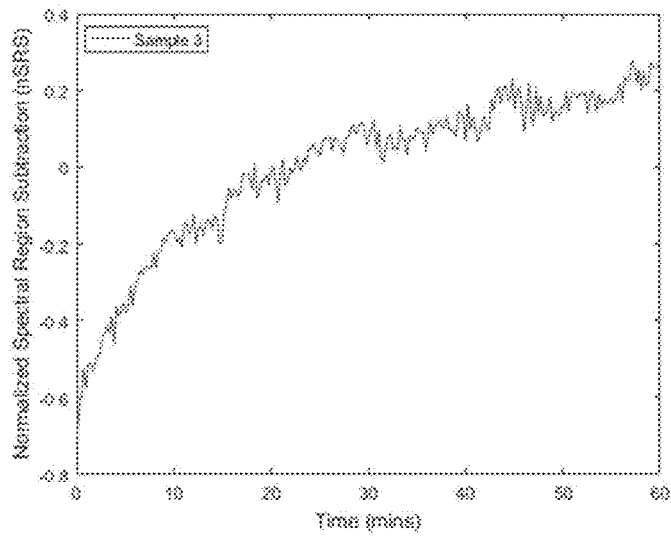
FIG. 6C depicts a plot of normalized spectral region subtraction against time for a third sample of vapochromic sensing materials fabricated according to one embodiment of the invention.

FIG. 5 shows the normalized spectral region subtraction responses for three samples of solid doped polymer 50 to 5 ppm concentrations of ammonia. As can be seen in FIG. 5, all three samples show an increase in signal over time of exposure to ammonia. Likewise, FIG. 6A to 6C show the normalized spectral region subtraction responses for three samples of solid doped polymer 50 to 1 ppm concentrations of ammonia. As can be seen in FIGS. 6A to 6C, all three samples show an increase in signal over time of exposure to ammonia, even at low concentrations of ammonia (e.g. 1 ppm).

Figure 7A:
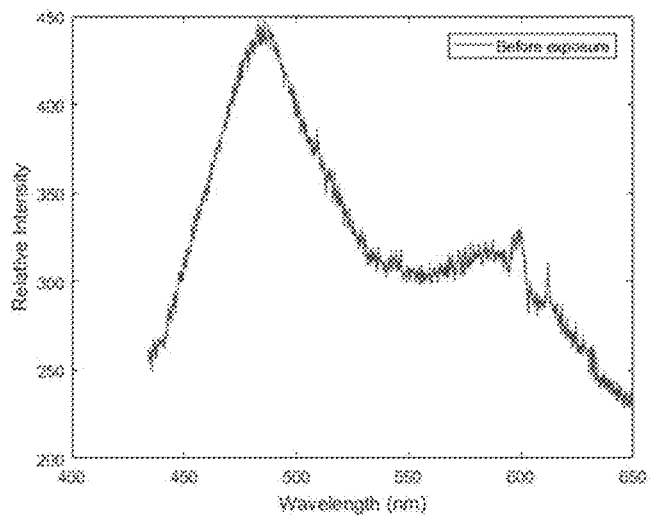
FIG. 7A depicts a plot of relative intensity against time for a sample of vapochromic sensing materials fabricated according to one embodiment of the invention before exposure.
Figure 7B:
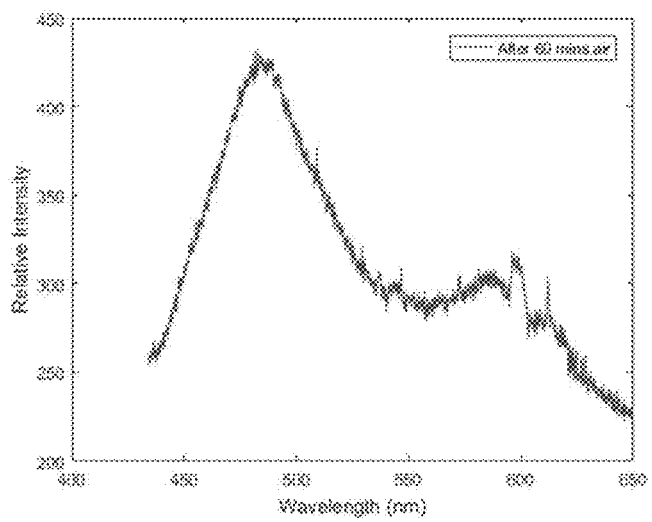
FIG. 7B depicts a plot of relative intensity against time for a sample of vapochromic sensing materials fabricated according to one embodiment of the invention after exposure to air for 60 minutes.
Figure 7C:
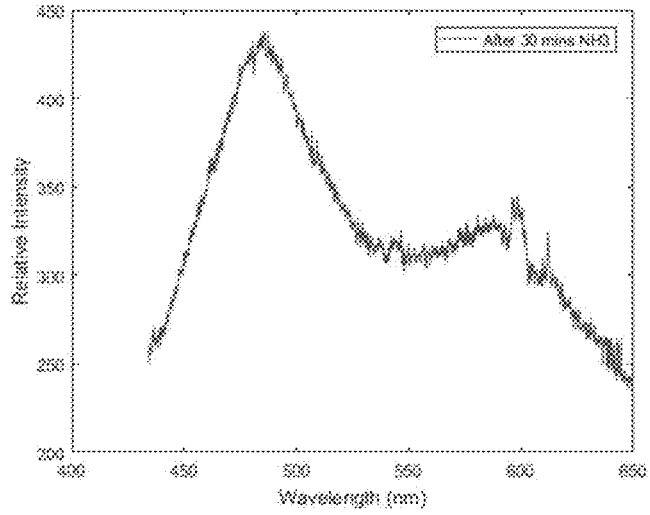
FIG. 7C depicts a plot of relative intensity against time for a sample of vapochromic sensing materials fabricated according to one embodiment of the invention after exposure to ammonia for 30 minutes.
Figure 8:
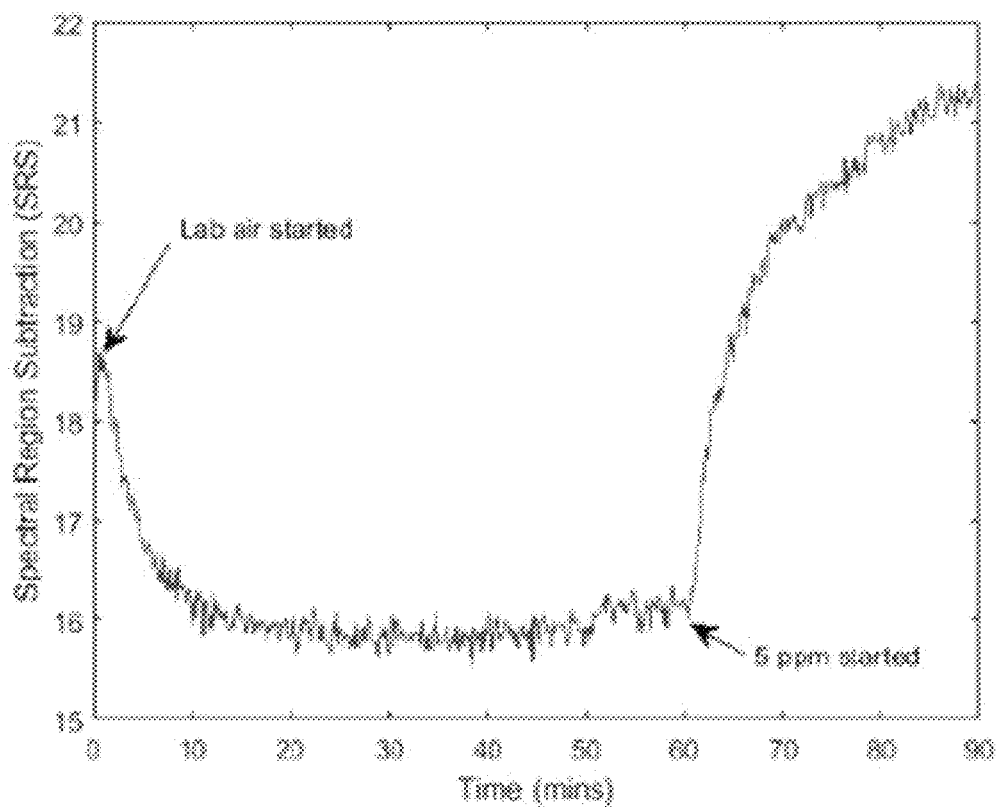
FIG. 8 depicts a plot of spectral region subtraction against time for a sample of vapochromic sensing materials fabricated according to one embodiment of the invention exposed to lab air and then to ammonia.

FIGS. 7A to 7C show the relative intensity response of solid doped polymer 50 to a cycle of lab air and 5 ppm ammonia. By comparing FIGS. 7A, 7B and 7C in the region of wavelengths between approximately 520 nm to 620 nm, it can be seen that there are distinct responses (exhibited through changes in the relative intensity) when the flow of gas is changed from air to a mixture of air and ammonia. Such a response can be seen more easily in the response of the spectral region subtraction, as is shown in FIG. 8 which represents the same conditions as FIGS. 7A, 7B and 7C. As can be seen in FIG. 8, there is a distinct change in the spectral region subtraction when the flow of ammonia began at approximately 60 minutes.

Interpretation of Terms

Where a component is referred to above, unless otherwise indicated, reference to that component (including a reference to a "means") should be interpreted as including as equivalents of that component any component which performs the function of the described component (i.e. that is functionally equivalent), including components which are not structurally equivalent to the disclosed structure which performs the function in the illustrated exemplary embodiments of the invention.

Unless the context clearly requires otherwise, throughout the description and any accompanying claims (where present), the words "comprise," "comprising," and the like are to be construed in an inclusive sense, that is, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. Additionally, the words "herein," "above," "below," and words of similar import, shall refer to this document as a whole and not to any particular portions. Where the context permits, words using the singular or plural number may also include the plural or singular number respectively. The word "or," in reference to a list of two or more items, covers all of the following interpretations of the word: any of the items in the list, all of the items in the list, and any combination of the items in the list.

While processes or blocks of some methods are presented herein in a given order, alternative examples may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. In addition, while elements are at times shown as being performed sequentially, they may instead be performed simultaneously or in different sequences. It is therefore intended that the following claims are interpreted to include all such variations as are within their intended scope.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

The invention claimed is:

1. A method for immobilizing insoluble dopants in polymer, the method comprising:
   dissolving a polymer carrier in a solvent;
   mixing an insoluble dopant in the dissolved polymer carrier to form a doped mixture;
   inducing phase separation of the doped mixture to obtain a doped hydrogel;
   allowing the doped hydrogel to solidify to form a doped solid; and
   activating the doped solid by exposing the doped solid to a target analyte.

2. The method according to claim 1 comprising allowing the doped hydrogel to solidify through solvent exchange.

3. The method according to claim 1 comprising allowing the doped hydrogel to solidify through solvent exchange by adding methanol to the doped hydrogel.

4. A method for immobilizing insoluble dopants in polymer, the method comprising:
   dissolving a polymer carrier in a solvent;
   mixing an insoluble dopant in the dissolved polymer carrier to form a doped mixture; and
   inducing phase separation of the doped mixture to obtain a doped hydrogel;
   allowing the doped hydrogel to solidify to form a doped solid; and
   forming pellets from the doped solid.

5. The method according to claim 4 comprising activating the doped solid by exposing the doped solid to a target analyte in at least one of: a gaseous form; a liquid form; and a solution form.

6. A method for immobilizing insoluble dopants in polymer, the method comprising:
   dissolving a polymer carrier in a solvent;
   mixing an insoluble dopant in the dissolved polymer carrier to form a doped mixture; and
   inducing phase separation of the doped mixture to obtain a doped hydrogel;
   allowing the doped hydrogel to solidify to form a doped solid; and
   extruding the doped solid into 3D-printable filament.

7. The method according to claim 1 wherein the solvent comprises a halogenated solvent.

8. The method according to claim 1 wherein the solvent comprises dichloromethane.

9. The method according to claim 1 wherein the solvent comprises a hydrocarbon solvent.

10. The method according to claim 4 wherein the solvent comprises cyclohexane.

11. A method for immobilizing insoluble dopants in polymer, the method comprising:
    dissolving a polymer carrier in a solvent;
    mixing an insoluble dopant in the dissolved polymer carrier to form a doped mixture; and
    inducing phase separation of the doped mixture to obtain a doped hydrogel;
    wherein the solvent comprises an aromatic solvent.

12. A method for immobilizing insoluble dopants in polymer, the method comprising:
    dissolving a polymer carrier in a solvent;
    mixing an insoluble dopant in the dissolved polymer carrier to form a doped mixture; and
    inducing phase separation of the doped mixture to obtain a doped hydrogel;
    wherein the solvent comprises toluene.

13. A method for immobilizing insoluble dopants in polymer, the method comprising:
    dissolving a polymer carrier in a solvent;
    mixing an insoluble dopant in the dissolved polymer carrier to form a doped mixture; and
    inducing phase separation of the doped mixture to obtain a doped hydrogel;
    wherein the solvent comprises chloroform.

14. The method according to claim 4 wherein dissolving the polymer carrier in the solvent comprises dissolving between 13% and 25% by weight polymer carrier in the solvent.

15. The method according to claim 4 wherein dissolving the polymer carrier in the solvent comprises dissolving approximately 18% by weight polymer carrier in the solvent.

16. The method according to claim 1 wherein the polymer carrier comprises a thermoplastic polymer.

17. The method according to claim 1 wherein the polymer carrier comprises a thermoplastic polymer having a glass transition temperature of less than 600° C.

18. A method for immobilizing insoluble dopants in polymer, the method comprising:
    dissolving a polymer carrier in a solvent;
    mixing an insoluble dopant in the dissolved polymer carrier to form a doped mixture; and
    inducing phase separation of the doped mixture to obtain a doped hydrogel;
    wherein the polymer carrier comprises a thermoset polymer.

* * * * *